United States Patent

Pinnow et al.

[15] 3,699,478
[45] Oct. 17, 1972

[54] DISPLAY SYSTEM

[72] Inventors: Douglas A. Pinnow, Berkeley Heights; Le Grand G. Van Uitert, Morris Township, Morris County, both of N.J.

[73] Assignee: Bell Telephone Laboratories, Incorporated, Murray Hill, N.J.

[22] Filed: May 26, 1969

[21] Appl. No.: 827,644

[52] U.S. Cl..................332/7.51, 250/199, 178/6.8
[51] Int. Cl..............................................H01s 3/00
[58] Field of Search .........332/7.51; 250/71, 80, 199; 330/334, 108; 252/301.4; 340/324, 173; 178/6.8

[56] References Cited

UNITED STATES PATENTS

| | | | |
|---|---|---|---|
| 3,541,542 | 11/1970 | Duguay et al. | 340/324 |
| 3,495,034 | 2/1970 | Areno et al. | 350/160 |
| 3,341,825 | 9/1967 | Schrieffer | 340/173 |
| 3,453,604 | 7/1969 | Geusic et al. | 330/4.3 |
| 3,322,682 | 5/1967 | Thompson | 252/301.4 |
| 3,374,381 | 3/1968 | Albinak et al. | 313/108 |
| 3,474,248 | 10/1969 | Brown et al. | 250/71 |
| 3,488,503 | 1/1970 | Reich et al. | 250/199 |
| 3,513,346 | 5/1970 | Awazu et al. | 313/108 |
| 3,524,011 | 8/1970 | Korpel | 250/199 |

FOREIGN PATENTS OR APPLICATIONS

| | | | |
|---|---|---|---|
| 1,564,271 | 3/1969 | France | 252/301.4 |

*Primary Examiner*—Benjamin A. Borchelt
*Assistant Examiner*—N. Moskowitz
*Attorney*—R. J. Guenther and Edwin B. Cave

[57] ABSTRACT

A black and white display is produced by projection using a scanning argon laser beam operating at 4,880 A and a phosphorescent screen of cerium-doped yttrium aluminum garnet which emits a broad range of frequencies centering about 5,500 A. The yellowish cast of the phosphor output is compensated by a small amount of reflected blue argon light.

8 Claims, 2 Drawing Figures

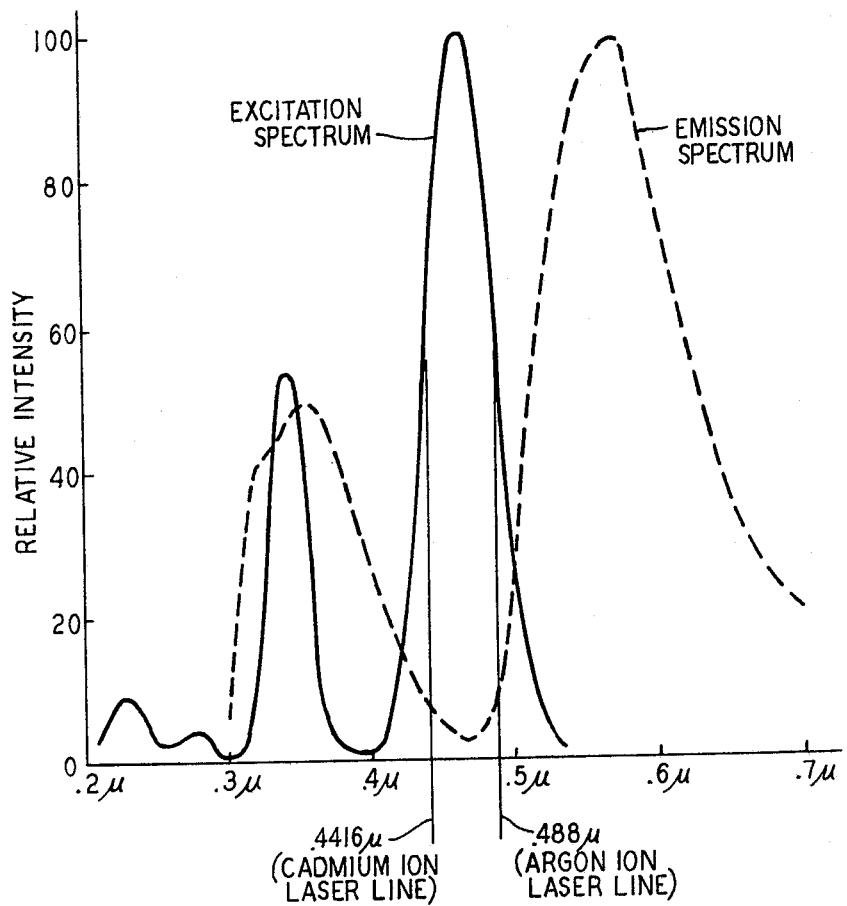
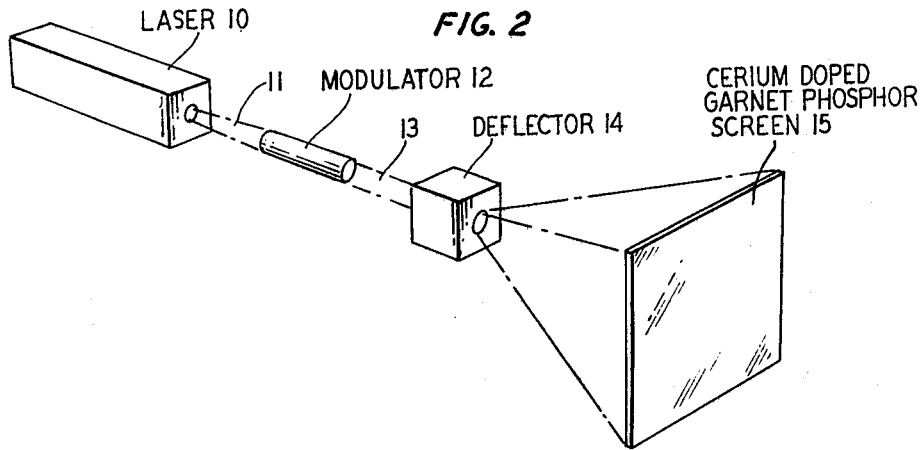

DISPLAY SYSTEM

BACKGROUND OF THE INVENTION

1. Field of the Invention

The invention is concerned with projection display systems and is primarily concerned with those producing black and white images.

2. Description of the Prior Art

Interest in laser display systems is based on the premise of screens of essentially unlimited size. Many of the elements necessary for such systems are presently available. High intensity lasers operating at a variety of frequencies within the visible spectrum have been demonstrated as having modulation and scanning techniques of sufficient capacity for most projected uses.

One popular approach, production of images by direct reflection of visible emission is subject to two drawbacks. First, images are monochromatic of a particular well-defined wavelength so that images produced by use of an argon-ion laser, for example, may be blue and black; and, second, reflection of coherent laser output produces a speckled image due to periodic reinforcement of the scattered beam. See Vol. 46, Bell System Technical Journal, p. 1,479, Sept. 1967.

So far as is known, there is no demonstrated or proposed laser visual display system producing black and white images free from speckle problems.

SUMMARY OF THE INVENTION

A laser display system results in a black and white image with a minimum of speckling. The system depends upon the use of a phosphorescent screen of cerium-activated garnet energized by a laser emitting in the visible at a somewhat shorter wavelength than the bulk of the emission from the screen. In a preferred arrangement yttrium aluminum garnet containing cerium is used. The characteristically yellowish cast of the emission from this phosphor as seen by the eye is adjusted to appear more nearly white by deliberate reflection of a portion of the laser emission.

From the compositional standpoint, a preferred embodiment of the invention utilizes a screen coated with cerium-doped yttrium aluminum garnet (YAG) energized by an argon-ion laser arranged so as to emit at 4,880 A. The cerium-activated phosphor emits over a broad range of wavelengths centering about 5,500 A.

Variations include other laser sources, such as a cadmium-ion laser which may emit at 4,416 A, as well as variations in the phosphor composition. All such compositions are cerium-activated and utilize a host of the garnet structure (i.e. the structure of $Y_3Al_5O_{12}$) since this is the only known combination to produce reemission of appropriate color and brightness. The absorption peak for the phosphor may, however, be shifted to more closely match a particular energizing source; and to this end, aluminum may be partially replaced by gallium to shift the absorption to shorter wavelength, or yttrium may be replaced, in whole or in part, by gadolinium to shift the absorption to longer wavelength. Since a shift in absorption generally produces a corresponding shift in emission in the same direction, color adjustment (for example, to produce a white image) by reflection of a portion of the laser beam continues to be feasible. Other variants are discussed.

BRIEF DESCRIPTION OF THE DRAWING

FIG. 1, on coordinates of relative intensity based on a maximum scale value of 100, and wavelength in microns, is a plot of the emission and associated excitation spectra for unmodified cerium-doped YAG; and FIG. 2 is a perspective view of a system in accordance with the invention.

DETAILED DESCRIPTION

1. Drawing

Referring again to FIG. 1, the data presented are the emission and related excitation spectra for cerium-doped YAG. The emission spectrum is in broken outline with the broad peak of concern having its maximum value at a wavelength of about 0.55 micron. The associated excitation spectrum shown in solid outline is a measure of the intensity of the emission noted for various pump frequencies. The most pronounced excitation peak coincides with a pump wavelength of about 0.46 micron. The emission wavelengths for two prominent laser lines are also indicated. The first, for the argon-ion laser, is at 0.488 micron. The second, for the cadmium-ion laser, is at 0.4416 micron. The laser lines are shown as solid vertical lines.

FIG. 2 is a perspective view of a simple system in accordance with the invention. Energizing light is produced by laser 10 which may, for example, be an argon-ion laser or a cadmium-ion laser. The emerging beam 11 first enters modulator 12 which is provided with a modulating signal by means, not shown, for amplitude modulating the beam. Modulation may be accomplished, for example, by electro-optic, acousto-optic, or magneto-optic techniques.

A description of suitable acousto-optic devices is contained in Vol. 46, BSTJ, p. 367, February, 1967. A description of suitable electro-optic devices is described in Vol. 38, Journal of Applied Physics, pp. 1,611–1,617, March, 1967. In any event, modulation may be accomplished by altering the total amount of light of a particular polarization sense which is passed by an analyzer incorporated in the modulator, or alternatively by controlling the amount of light which is deflected acousto-optically.

Upon emerging from modulator 12, the beam, now denoted 13, enters deflector 14 which produces the appropriate horizontal and vertical deflection so as to fill screen 15. Deflector 14 may advantageously operate on an acousto-optic principle, see, for example, Vol. 57 Proceedings of the IEEE, pg. 160, Feb., 1969. The deflector 14 may also perform the modulation function eliminating the need for a separate modulator 12. Earlier deflector systems utilize mechanical, sometimes motor driven, scanners.

Inventive novelty is premised largely on the nature of phosphor screen 15 as incorporated in the overall system. Laser display systems of the general nature of that of FIG. 2 are described in some detail in the existing scientific literature. See, for example, IEEE Spectrum for December 1948 at page 49, et seq.

The chemical nature of this screen is described in some detail in the section which follows.

2. Composition

The inventive system depends upon a phosphor screen containing trivalent cerium in an appropriate host. Emission of $Ce^{3+}$ is generally in the near ultraviolet. However, it is known, probably due to the large crystal field splittings in garnet such as YAG, that emission may be shifted to the visible. As seen from FIG. 1, the emission for YAG:Ce$^{3+}$ is quite broad with a peak at about 0.55 micron (yellowish white). The peak absorption in that lattice centers about 0.46 micron and this absorption spectrum is suitable for use either with the argon (0.4884$\mu$) or cadmium (0.4416$\mu$) laser. As discussed in a subsequent section, there may be no particular advantage gained by shifting the absorption to exactly coincide with the laser emission.

While reference has been made to "absorption spectrum," only the absorbed energy which is converted to visible emission as discussed, is of consequence for the purposes of the invention. Absorbed energy usefully converted in this fashion may be represented in terms of an "excitation" spectrum, and it is in these terms that the data of FIG. 1 is represented.

The excitation spectrum in the cerium-doped garnet may be shifted to accommodate the lasers discussed or to more effectively utilize other laser sources. To this end, the prototypical composition, $Y_3Al_5O_{12}$, may be modified by partial or total substitution of gallium for aluminum and/or gadolinium for yttrium. The former has the effect of moving the excitation peak to shorter wavelength while the latter has the opposite effect. The peak of the excitation spectrum may be tailored in this manner within the range of from about 0.33 micron to about 0.48 micron; however, useful excitation may be accomplished over the broader range of about 0.30 micron to 0.53 micron.

A shift in the excitation spectrum produces an accompanying shift in the emission spectrum with the range of emission peaks being from about 0.51 micron to about 0.61 microns. For the preferred embodiment designed to produce a white or near-white image, the emission peak should not be at wavelengths less than about 0.52 micron (corresponding with an excitation peak of about 0.43 micron which results in a YAG composition modified by substitution of about 45 atom percent gallium for aluminum). From the same standpoint for this preferred embodiment, the phosphor should not be modified so as to result in an excitation peak at wavelengths greater than about 0.58$\mu$ (or, more properly energization should not exceed this limit) since even ineffective conversion will result in addition of some longer wavelength light and, therefore, will impart a yellowish tinge to the reflected emission. YAG in which 70 atom percent yttrium is replaced by gadolinium corresponds with this condition and, therefore, this represents the maximum uncompensated partial substitution of gadolinium for the preferred embodiment.

Phosphor compositions suitable for use in accordance with the invention invariably depend upon cerium activation. A suitable cerium range is from about 0.001 to about 0.15 atom per formula unit of garnet (based on the stoichiometry $Y_3Al_5O_{12}$). (Ce$^{3+}$ substitutes for yttrium and therefore reduces the amount of this action by an equal amount). The lower limit on cerium content represents the minimum concentration resulting in a readily discernible reemission image, while the maximum approximately coincides with the solubility limit in the garnet. A preferred cerium range is from 0.005 to 0.10. The lower limit is based on minimum concentration required for a reemission image discernible in ordinary room lighting, and the upper limit is occasioned by the fact that further increase results in little improvement. Its preference is based largely on economics (as compared with the broad maximum above).

In view of the above considerations, the overall phosphor limits may be set forth as:

$$Y_{3-x-y}Ce_xGd_yAl_{5-z}Ga_zO_{12} \qquad (1)$$

in which
- $x$ is from 0.001 to 0.15 or in the preferred range, is from 0.005 to 0.01,
- $Y$ is from 0 to 2.999 and
- $z$ is from 0 to 3.0.

Certain other substitutions are possible. So, for example, lutecium or lanthanum may be substituted for yttrium, and indium or scandium may replace aluminum in part. However, since suitable excitation and emission spectra may be obtained in the more common and more economical YAG or substituted YAG system, it is not expected that further modifications will go into commercial use.

3. Design criteria

While occasions may arise in which it is desired to produce colored or off-white images, the more significant aspect of the invention is concerned with white or near-white images. In the unmodified YAG:Ce system using an argon or cadmium laser, white images may result by compensation of the secondary yellow cast emission by some reflection of the shorter wavelength laser emission. Under these circumstances it is desired to design layer thicknesses and compositions or provide for some reflection such that total absorption does not result.

Modification of the YAG:Ce system within the compositional range described may shift the emission so that it needs no compensation. This may be accomplished, for example, by partial substitution of gallium aluminum in the 20 to 60 percent range per formula unit. Under such circumstances, the phosphor layer is designed so as to result in little or no reflection. This may be accomplished by providing for essentially complete absorption and minimal reflection.

In one experimental arrangement, apparently white images resulted from use of the composition $Y_{2.99}Ce_{0.01}Al_5O_{12}$. It was found that approximately 50 percent of the energy of a one watt 0.488$\mu$ argon beam was absorbed in a layer thickness of about 0.4 millimeters. The image could be further intensified by providing a mirror backing thereby resulting in total absorption (within the excitation band) of about 75 percent of the laser energy. The approximate 25 percent of the converter laser energy suffices to compensate for the yellowish cast of the reemission.

It is apparent that final design of a phosphor screen depends upon power levels, laser wavelength, phosphor absorption level and emission wavelength. Reflection of unconverted laser emission may be enhanced by using thinner coatings, by reflective backings (although this also results in additional secondary emission during retraversal) and by incorporation of "inert" material such as talc.

In the main, inventive novelty is premised on phosphor composition and the chromaticity balance achieved between the laser wavelength and the emission wavelength. Display systems have been discussed in terms of one exemplary arrangement. Variations may utilize a laser source which is behind rather than in front of a screen and a variety of other arrangements for folding beams, for modulation, for deflection, etc.

What is claimed is:

1. Visual display apparatus comprising a laser for emitting at a wavelength in the visible spectrum, first means for amplitude modulating the output of such laser, second means for deflecting said beam, and a screen, characterized in that said screen comprises a layer of a phosphorescent composition consisting essentially of a material which may be represented by the formula $Y_{3-x-y}Ce_xGd_yAl_{5-z}Ga_zO_{12}$ in which $x$ is from 0.001 to 0.15, $y$ is from 0 to 2.999 and $z$ is from 0 to 3.0, in which apparatus the said laser emits at a wavelength between 0.3 and 0.53$\mu$ and the said phosphorescent composition appears to the eye to fluoresce essentially white, it being a characteristic of such apparatus that a visual display resulting from use is essentially free from speckle.

2. Apparatus of claim 1 in which the said phosphorescent composition and screen design are such that a portion of the laser emission is unconverted so that the combination of reflected laser emission and the $\mu$ emission from the screen appears approximately white.

3. Apparatus of claim 1 in which the laser is an argon-ion laser.

4. Apparatus of claim 1 in which the laser is a cadmium-ion laser.

5. Apparatus of claim 1 in which the phosphor composition consists essentially of $Y_{3-x}Ce_xAl_5O_{12}$.

6. Apparatus of claim 1 in which the said first means is an electro-optic modulator and in which the said second means is an acousto-optic deflector.

7. Apparatus of claim 1 in which the said first and second means depend upon an acousto-optic interaction.

8. Apparatus of claim 7 in which said first and second means constitute a single unit.

* * * * *